(12) United States Patent
Ueno et al.

(10) Patent No.: US 6,542,225 B2
(45) Date of Patent: Apr. 1, 2003

(54) SURVEYING MACHINE AUTOMATICALLY ADJUSTING OPTICAL AXIS

(75) Inventors: Masayuki Ueno, Nerima-ku (JP); Homu Takayama, Nerima-ku (JP)

(73) Assignee: Pentax Precision Co., Ltd., Tokyo (JP)

( * ) Notice: Subject to any disclaimer, the term of this patent is extended or adjusted under 35 U.S.C. 154(b) by 0 days.

(21) Appl. No.: 10/102,770

(22) Filed: Mar. 22, 2002

(65) Prior Publication Data

US 2002/0186361 A1 Dec. 12, 2002

(30) Foreign Application Priority Data

Jun. 7, 2001 (JP) .......................................... 2001-172161
Feb. 14, 2002 (JP) .......................................... 2002-036300

(51) Int. Cl.[7] ............................ G01C 3/08; G01B 11/26
(52) U.S. Cl. .......................................... 356/5.1; 356/153
(58) Field of Search ............................... 356/4.01–5.15, 356/141.2, 152.1, 153

(56) References Cited

U.S. PATENT DOCUMENTS

| | | | | | |
|---|---|---|---|---|---|
| 3,470,377 A | * | 9/1969 | Febre et al. | ................ | 250/204 |
| 4,146,329 A | * | 3/1979 | King et al. | ............ | 356/139.05 |
| 4,349,838 A | * | 9/1982 | Daniel | ........................ | 348/169 |
| 4,569,591 A | * | 2/1986 | Ford et al. | .................. | 356/153 |
| 4,772,122 A | * | 9/1988 | Kasner | .................. | 356/139.05 |
| 4,843,228 A | * | 6/1989 | Nakamura | ............... | 250/201.4 |
| 6,324,024 B1 | * | 11/2001 | Shirai et al. | ................ | 359/884 |
| 6,344,894 B1 | * | 2/2002 | Liou | ......................... | 356/4.01 |
| 6,411,371 B1 | * | 6/2002 | Hinderling et al. | ........ | 356/4.01 |

* cited by examiner

Primary Examiner—Thomas H. Tarcza
Assistant Examiner—Brian Andrea
(74) Attorney, Agent, or Firm—Sughrue Mion, PLLC (57) ABSTRACT

A surveying machine that automatically adjusts an optical axis includes a sighting optical system for sighting an object, a light-transmitting optical system that transmits a beam for surveying, radiated from a light source, to the object, a deviation detector, and an optical axis adjuster. The deviation detector detects a deviation between a first optical axis corresponding to the sighting optical system and a second optical axis corresponding to the light-transmitting optical system. The optical axis adjuster automatically adjusts at least one of the first optical axis and the second optical axis so as to correct the deviation.

14 Claims, 8 Drawing Sheets

SURVEYING MACHINE AUTOMATICALLY ADJUSTING OPTICAL AXIS

BACKGROUND OF THE INVENTION

1. Field of the Invention

The present invention relates to an optical axis adjustment in a surveying machine.

2. Description of the Related Art

In a surveying machine, such as a total-station (an electronic tacheometer), an electronic/optical theodolite, a leveling machine, and so on, a sighting optical system for sighting an object, and a light-transmitting optical system for transmitting light radiated from a light source to the object, are provided. Generally, a signal target or pole is located at a surveying-position (a station), and the signal target or pole is sighted using the sighting optical system. The light radiated from the light source passes the light-transmitting optical system and is emitted from the surveying machine toward a sighted point on the signal target or pole.

An optical axis of the light-transmitting optical system is adjusted in advance such that the optical axis coincides with an optical axis of the sighting optical system. Consequently, the light, radiated from the surveying machine via the light-transmitting optical system, reaches the sighted point on the signal target. Thus, a precise survey can be performed. Namely, a distance, an angle, and a horizontal level can be precisely measured.

However, the optical axis of the light-transmitting optical system occasionally displaces relative to the optical axis of the sighting optical system because of a change of temperature, or humidity. In this case, the point where the light reaches does not coincide with the sighted point so that a precise measurement cannot be performed. To match the two optical axes, it is necessary to manually adjust the position of a reflecting mirror, provided as part of the light-transmitting optical system. However, this adjustment is very troublesome and very difficult for the user.

SUMMARY OF THE INVENTION

Therefore, an object of the present invention is to provide a surveying machine that can provide precisely measurements at any time without requiring manual adjustments of the optical axis.

A surveying machine according to the present invention includes a sighting optical system for sighting an object, and a light-transmitting optical system. For example, a signal target such as a reflecting sheet, or a reflecting prism, or similar, is used as an object to be sighted, and is arranged at a station. The sighting optical system has, for example, an objective lens, a focusing glass and an erecting optical ember, such as an erecting prism, and an eyepiece. The light-transmitting optical system transmits a beam for surveying, radiated from a light source, to the object. When the surveying machine is a leveling machine or an electronic/optical theodolite, the beam for sighting, such as a Laser, is emitted and transmitted, on the other hand, when the surveying machine is a total-station or an electronic distance-meter, the beam for measuring a distance between the surveying machine and the object is emitted and transmitted.

The surveying machine of the present invention includes a deviation detector and an optical axis adjuster. The deviation detector detects a gap, namely, a deviation between an optical axis of the sighting optical system and an optical axis of the light-transmitting optical system. When the beam, passing through the light-transmitting optical system, does not progress along the optical axis of the sighting optical system toward the sighted point, a deviation occurs. The deviation detector detects the deviation by detecting the situation where the beam does not reach the pointed sighted by the sighting optical system. Hereinafter, the optical axis of the sighting optical system is designated as the "first optical axis" and the optical axis of the light-transmitting optical system is designated as the "second optical axis".

The optical axis adjuster automatically adjusts at least one of the first optical axis and the second optical axis so as to correct the deviation. For example, the optical axis adjuster adjusts the second optical axis such that the beam progress along the first optical axis toward the sighted point, or the optical axis adjuster adjusts the first optical axis such that the first optical axis is along the progressing direction of the beam, which corresponds to the second optical axis.

As the deviation is automatically detected and is automatically corrected, a precise distance, precise level, or precise angle, etc., is obtained using the surveying machine.

To maintain the stability of the sighting optical system, namely, not to change the first optical axis, preferably, the optical axis adjuster adjusts the second optical axis without adjusting the first optical axis. Generally, the light-transmitting optical system includes al least one of a reflecting optical member and a refracting optical member. In this case, the optical axis adjuster includes a positioning changer that changes a position of the reflecting optical member, or the refracting optical member. To compensate for the deviation, the optical axis adjuster adjusts the second optical axis by changing the position of the reflecting or refracting optical member in accordance with the deviation.

When the surveying machine is a total-station or a digital distance-meter, a distance detector is provided in the surveying machine. The distance detector measures the distance between the surveying machine and the object by receiving a beam of reflected light from the object.

To detect the deviation by utilizing the construction of prior surveying machines as much as possible, preferably, the deviation detector detects the deviation on the basis of the reflected light, from the object, which passes through the sighting optical system. Namely, the deviation detector detects the deviation from the difference between the first optical axis and the progressing-direction of the beam, which is included in reflected light from the object. To detect the deviation as two-dimensional information, preferably, the deviation detector includes a two-dimension deviation detector that receives the beam and detects the deviation represented by two-dimensional coordinates defined on a focal plane. The two-dimension deviation detector detects the deviation on the basis of an incidence position of the beam and a preset base-position corresponding to the first optical axis.

In the case of the total-station or the digital distance-meter, a specific area reflecting optical member is arranged in the sighting optical system. The specific area reflecting optical member has a reflecting area and a penetrating area. The reflecting area selectively reflects the beam from among the reflected light, to the distance detector. The penetrating area, namely, transmitting area enables all of the reflected light to penetrate. Consequently, both the distance and the deviation are detected on the basis of the beam passing through the sighting optical system.

For example, the specific area reflecting optical member is constructed of a single member, in which the reflecting area and the penetrating area are formed in a body, or the specific area reflecting optical member is constructed of a plurality of members, in which the reflecting area and penetrating area are formed separately.

To detect the deviation by utilizing the beams passing through the sighting optical system, preferably, a selective reflecting optical member or a selective penetrating optical member is arranged in the sighting optical system. The selective reflecting optical member divides the beam from the reflected light by reflecting the beam, whereas the selective penetrating optical member divides the beam from the reflected light by allowing only the beam to penetrate. For example, the selective reflecting optical member has a first dichroic surface that reflects only light having a wavelength area corresponding to the beam. On the other hand, the selective penetrating optical member has a second dichroic surface that enables only light having a wavelength area corresponding to the beam to penetrate.

To detect the deviation by utilizing an optical member prepared as one of the elements of the sighting optical system, a selective penetrating optical member is used, that is an erecting prism having a second dichroic surface. The erecting prism is provided as one of the sighting optical system to erect an object image. Accordingly, the deviation is detected without including a new optical member for detecting the deviation in the sighting optical system.

An automatic optical axis adjusting apparatus of a surveying machine according to another aspect of the present invention has a deviation detector and an optical axis adjuster. The surveying machine has a sighting optical system for sighting an object, and a light-transmitting optical system for transmitting a beam for surveying. The beam is radiated from a light source, to the object. The deviation detector detects a deviation between a first optical axis corresponding to the sighting optical system and a second optical axis corresponding to the light-transmitting optical system. The optical axis adjuster automatically adjusts at least one of the first optical axis and the second optical axis so as to correct the deviation.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiments of the present invention are described with reference to the attached drawings.

Figure 1:
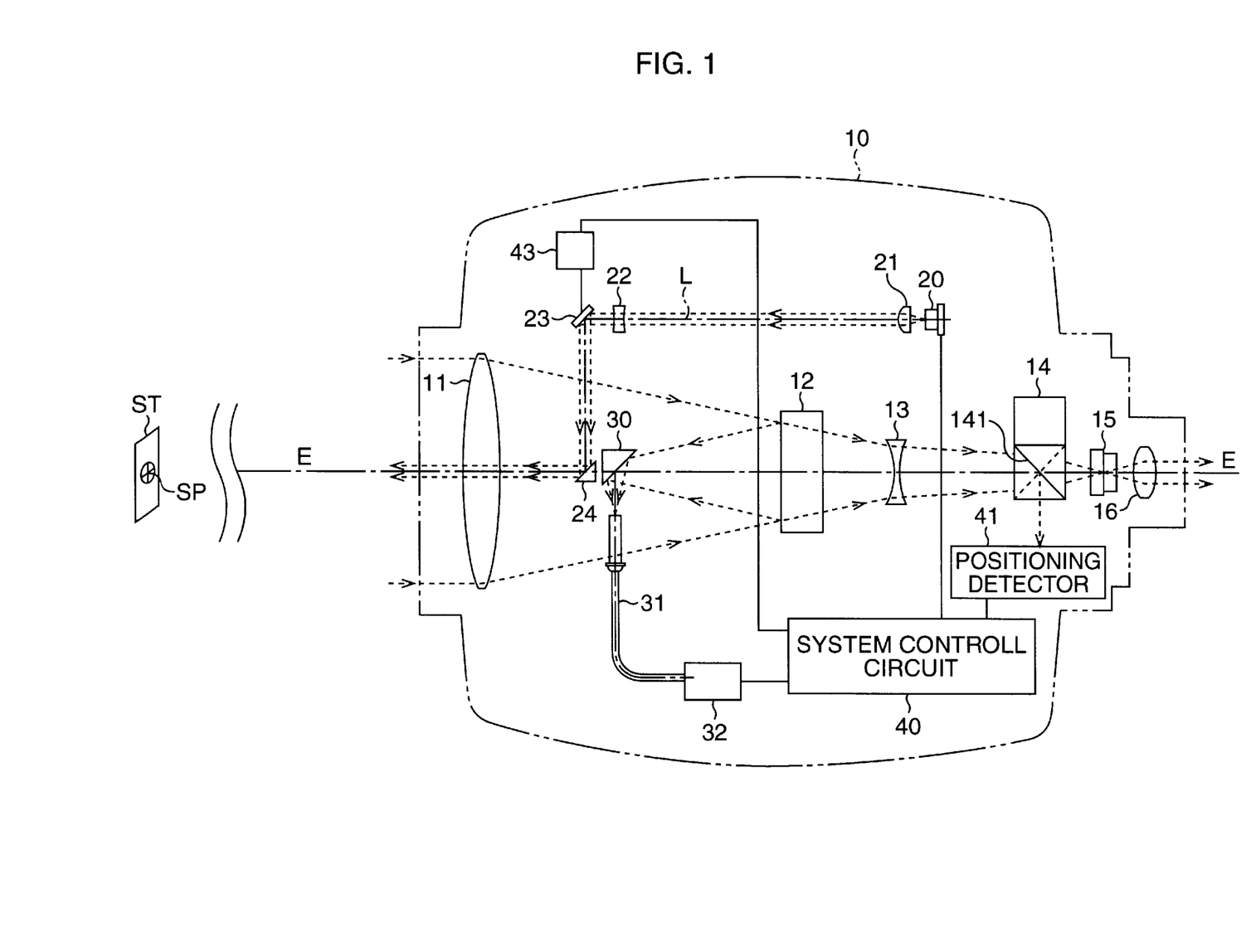
FIG. 1 is a block diagram of a lens barrel provided in a total-station according to a first embodiment.
Figure 2:
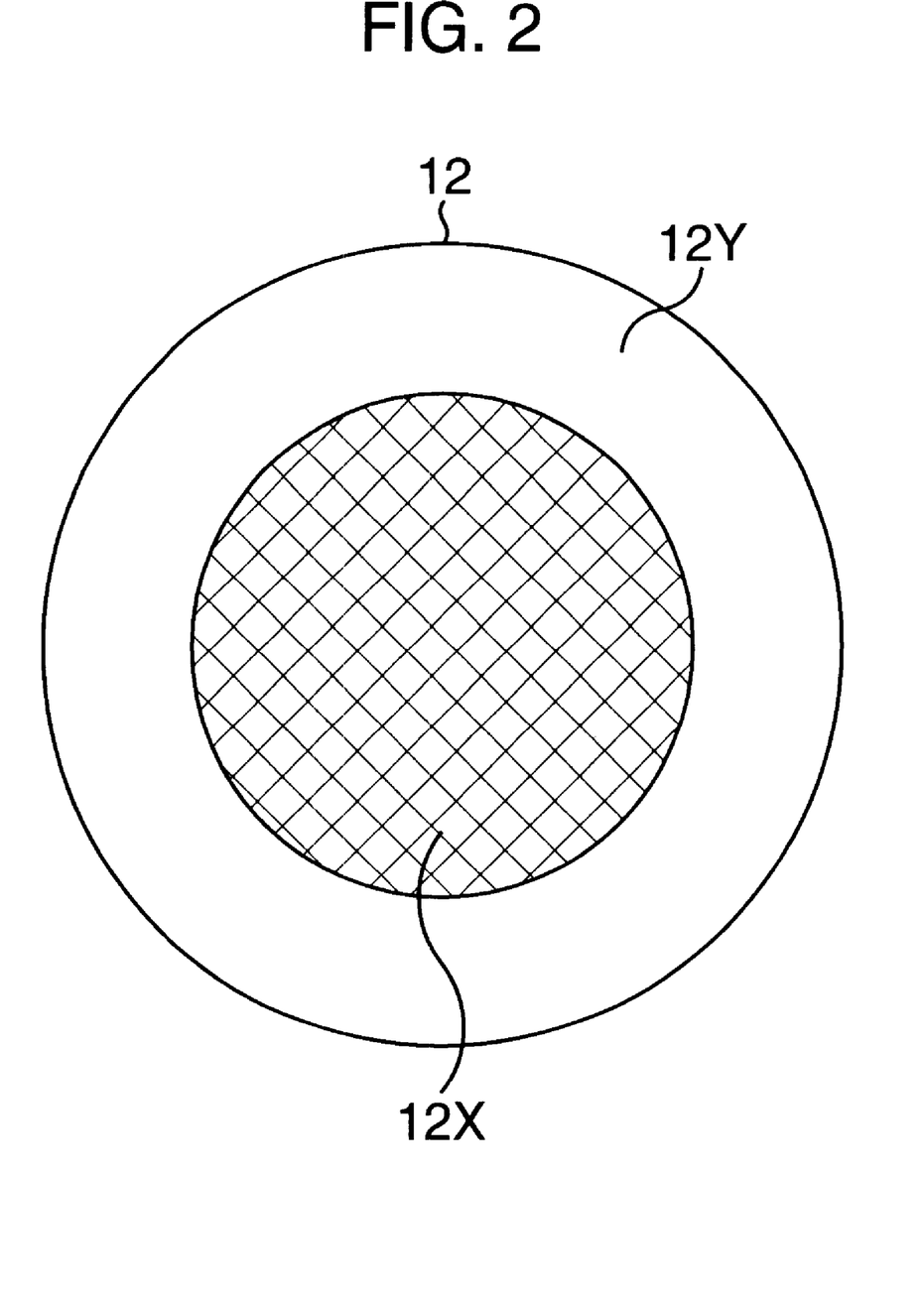
FIG. 2 is a front view of a specific-area reflecting mirror.
Figure 3:
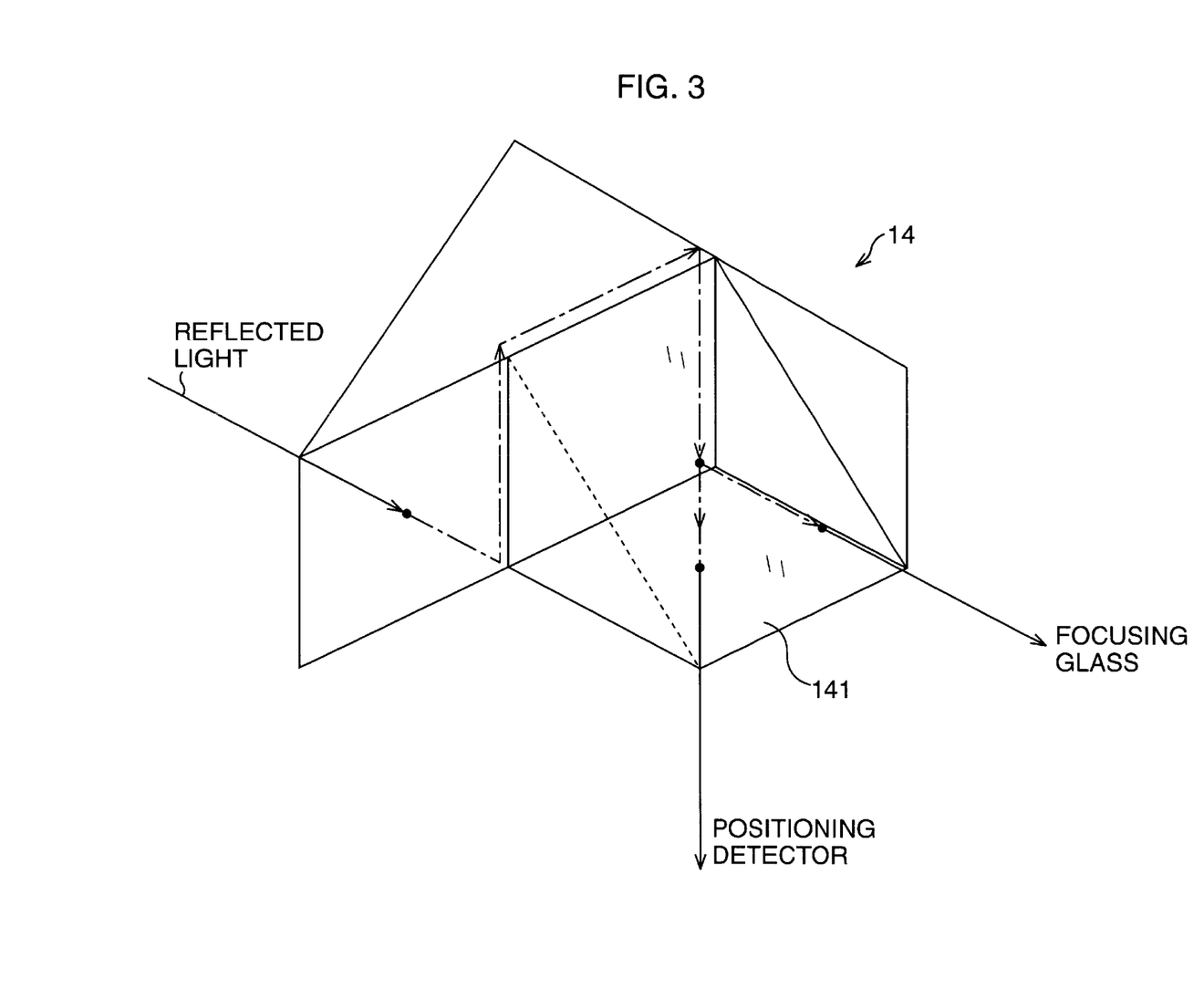
FIG. 3 is a perspective view of an erect optical system.

FIG. 1 is a block diagram of a lens barrel provided in a total-station according to a first embodiment. FIG. 2 is a front view of a specific-area reflecting mirror. FIG. 3 is a perspective view of an erecting optical system. The total-station, which is also called an "electronic tacheometer", can measure a distance between a sighted object, such as a signal target or corner cube, and the total-station, and further can measure an angle, such as a horizontal angle and an altitude, and so on. In the lens barrel 10, a sighting optical system and a light-transmitting optical system are provided. In this embodiment, a signal target ST, which is a reflecting sheet, is located at a station.

The Lens barrel 10 has an objective lens 11. The signal target ST is sighted via the objective lens 11, and light for measuring the distance is transmitted to the signal target via the objective lens 11. The lens barrel 10 is supported by a supporting member (not shown) and is rotatable around a horizontal axis and a vertical axis.

The sighting optical system for sighting the signal target ST is constructed of the objective lens 11, a specific-area reflecting mirror 12, a focus-adjusting lens 13, an erecting optical system 14, a focusing glass 15, and an eyepiece 16. The erecting optical system 14 is, herein, an erecting prism.

Light, which enters into the objective lens 11, is directed to the specific-area reflecting mirror 12, wherein, as will be described later, only a specific light component is reflected, whereas the other light components are directed to the focus-adjusting lens 13.

The focus-adjusting lens 13 shifts along an optical axis E of the sighting optical system to adjust a focal position. The light passing through the focus-adjusting lens 13 reaches the focusing glass 15 via the erecting optical system 14, so that an object image is formed on the focusing glass 15. Thus, the user can observe the object image, namely, the image of the signal target ST via the eyepiece 16.

In the focusing glass 15, a cross-shaped line is formed such that a cross image is observed via the eyepiece 16. The center of the cross-shaped line corresponds to a center of the focusing glass 15. Accordingly, a line connecting the center of the objective lens 11 with the center of the cross-shaped line coincides with the optical axis E of the sighting optical system.

In the lens barrel 10, alight source 20 is provided. In this embodiment, the light source 20 is a light-emitting device, such as an LED (Light-Emitting Diode) or an LD (Laser Diode), which emits modulated light of a narrow wavelength in the visible band area to measure the distance. In this embodiment, the wavelength of the modulated light is close to the wavelength of infrared light. Hereinafter, the light emitted from the light source 20 is designated as the "measurement-beam".

The measurement-beam is transmitted to the signal target ST via the light-transmitting optical system. The light-transmitting optical system is constructed of a collimator lens 21, an a focal lens 22, a first reflecting mirror 23, a second reflecting mirror 24, and the objective lens 11.

The measurement-beam emitted from the light source 20 is made parallel by the collimator lens 21 and is directed to the a focal lens 22. The a focal lens 22 adjusts the width of the measurement-beam. The measurement-beam passing through the a focal lens 22 is reflected on the first reflecting mirror 23 and the second reflecting mirror 24, and is radiated from the total station via the objective lens 11.

The measurement-beam radiated from the total station reaches a sighted point SP on the signal target ST, and is reflected on the sighted point SP. On the other hand, daylight is reflected on the signal target. Consequently, reflected light, which includes the measurement-beam, enters into the objective lens 11.

The reflected light is directed to a photoelectric device 32, such as photodiode, via a measuring optical system. The measuring optical system is constructed of the objective lens 11, the specific-area reflecting mirror 12, a light-receiving optical member 30, and a fiber-optic bundle 31.

The reflected light passing through the objective lens 11 is directed to the specific-area reflecting mirror 12. As shown in FIG. 2, the specific-area reflecting mirror 12 is formed in a disk, and has a reflecting area 12X formed around a center of the specific-area reflecting mirror 12 and a penetrating area 12Y formed along the circumference of the reflecting area 12X. The reflecting area 12X reflects only light having a narrow wavelength, the center of which corresponds to the spectrum peak of the measurement-beam. Namely, the reflecting area 12X reflects only the measurement-beam among the reflected light, and enables the other light components to penetrate. The penetrating area 12Y enables the reflected light to directly penetrate. Namely, the penetrating area 12Y transmits the reflected light to the focus-adjusting lens 13.

The measurement-beam reflected on the reflecting area 12X is directed to the light-receiving optical member 30. The measurement-beam is reflected on the light-receiving optical member 30 and enters into an incidence surface of the fiber-optic bundle 31. The measurement-beam passes through the fiber-optic bundle 31, and reaches the photoelectric device 32. In the photoelectric device 32, electric signals are generated by photoelectric conversion, the electric signals being fed to a system control circuit 40.

The system control circuit 40 controls the lens barrel 10, and calculates the distance by using the phase modulation measurement method. In the system control circuit 40, base-signals for controlling an emission timing of the light source 20 are output to the light source 20. The measurement-beam is emitted from the light source 20 on the basis of the base-signals. In the system control circuit 40, based on the phase difference of the electric signals from the photoelectric device 32 and the base-signals, the distance is calculated. The distance is displayed on a monitor (not shown) provided on the surveying machine.

On the other hand, the reflected light passing through the specific-area reflecting mirror 12 is directed to the erecting optical member 14. As shown in FIG. 3, the erecting optical member 14 has a selective reflecting surface 141, which corresponds to a dichroic mirror. The selective reflecting surface 141 enables only light having a narrow wavelength corresponding to the measurement-beam to penetrate. Consequently, the measurement-beam is directed to a positioning detector 41. The selective reflecting surface 141 reflects the reflected light except the measurement-beam, which is directed to the focusing glass 15.

In this embodiment, the positioning detector 41 is a CCD (Charge-Coupled Device), and has high-sensitivity to the measurement-beam. A plurality of photo-diodes are arranged two-dimensionally on a light-receiving area of the positioning detector 41. When the measurement-beam reaches the light-receiving area, the position of a photo-diode, which receives the beam, is detected as an incidence position of the measurement-beam.

The positioning detector 41 is provided in the lens barrel 10 such that the position of the positioning detector 41 is optically equivalent to the position of the focusing glass 15 with respect to a distance from the selective reflecting surface 141. Accordingly, a plane including the light-receiving area of the positioning detector 41 optically corresponds to a focal plane. On the light-receiving area, a base-position, which corresponds to the center of the cross-shaped line in the focusing glass 15 and corresponds to the sighted position SP, is defined in advance. The positioning detector 41 detects a difference between the incidence position and the base-position on the light-receiving area.

When the measurement-beam progresses along the optical axis E of the sighting optical system from the second reflecting mirror 24 to the signal target ST via the objective lens 11, namely, the optical axis L of the light-transmitting optical system coincides with optical axis E of the sighting optical system, the measurement-beam reflected on the sighted point SP reaches the base-position, corresponding to the center of the cross-shaped line, on the light-receiving area of the positioning detector 41. In this case, the difference does not occur. When a given difference occurs, the difference is detected as a deviation between the optical axis L and the optical axis E. Accordingly, the deviation is represented by two-dimension coordinate information. A detecting signal corresponding to the deviation is fed to the system control circuit 40.

In the system control circuit 40, a control signal for controlling the position of the first reflecting mirror 23, is fed to a mirror-rotating mechanism 43. The mirror-rotating mechanism 43 adjusts the position of the first reflecting mirror 23 to adjust the optical axis L of the light-transmitting optical system. Namely, the posture of the first reflecting mirror 23 is adjusted such that the optical axis L coincides with the optical axis E.

Note that, the adjustment of the optical axis is performed in accordance with a given operation. In the lens barrel 10, an adjusting switch, which is connected to the system control circuit 40, is provided on the total-station. When the adjusting switch is turned ON by an operation of the user, the adjustment of the optical axis is performed. Note, the adjustment of the optical axis may be performed at all times while the lens barrel 10 in the total-station is operated.

Figure 4:
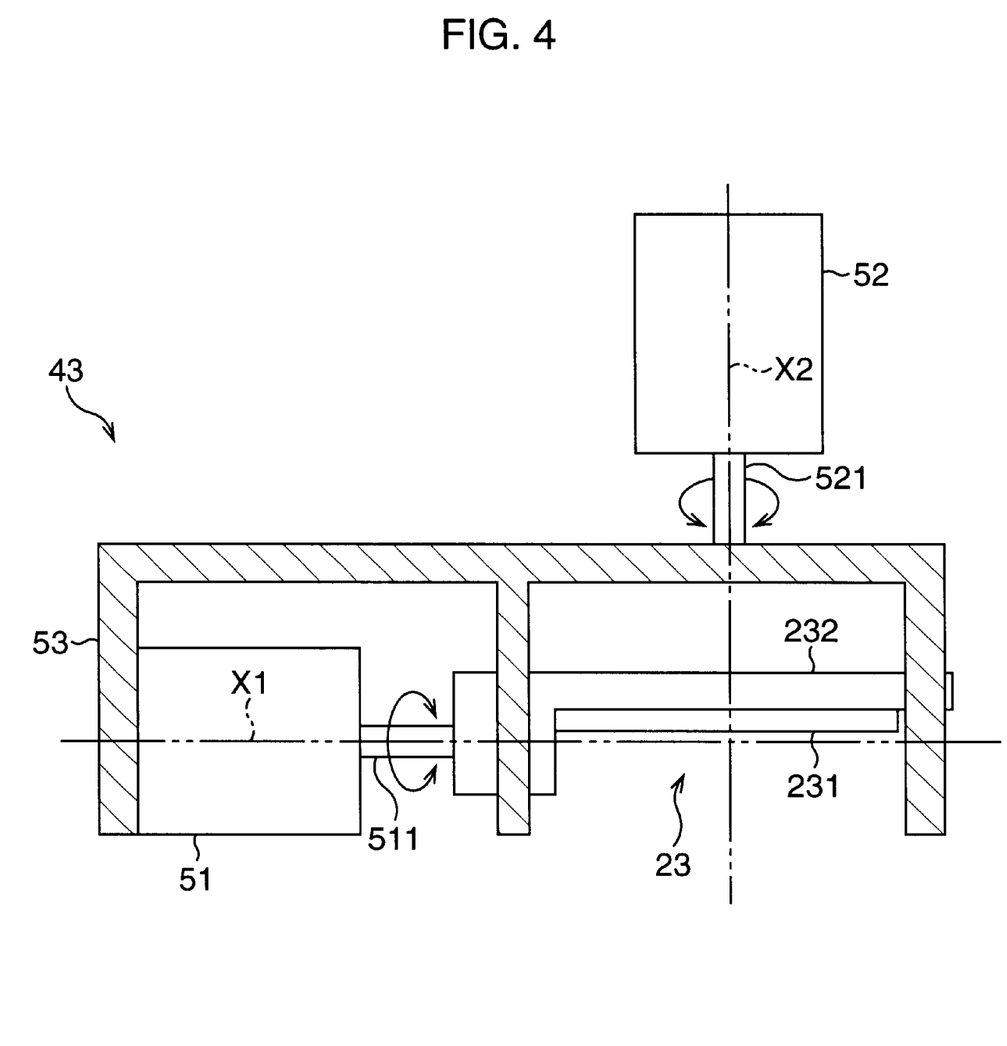
FIG. 4 is a schematic view showing a first reflecting mirror and a mirror-rotating mechanism.

FIG. 4 is a schematic view showing the first reflecting mirror 23 and the mirror-rotating mechanism 43. The mirror-rotating mechanism 43 has a first actuator 51 and a second actuator 52, and rotates the first reflecting mirror 23 around a first axis X1 and a second axis X2, which are perpendicular to each other. The first and second actuator 51 and 52 are stepping motors respectively, which operate on the basis of the control signal fed from the system control circuit 40.

The first reflecting mirror 23 has a mirror 231 and a mirror-holding member 232. The mirror 231 is a plate-shaped mirror, which reflects the measurement-beam fed from the light source 20. The mirror 231 is rigidly attached to the mirror-holding member 232. The mirror-holding member 232 is rigidly attached to an output axis 511 of the actuator 51 and is rotatably supported by a mirror-supporting member 53.

The first actuator 51 is rigidly attached to the mirror-supporting member 53, and rotates the mirror 231 and the mirror-holding member 232, namely, the first reflecting mirror 23 around the first axis X1. When the first actuator 51 is driven, the output axis 511 rotates around the first axis X1 so that the mirror 231 rotates around the first axis X1. Note that, the first axis X1 is on a line bisecting the reflecting-area of the mirror 231.

The mirror-supporting member 53 is rigidly attached to an output axis 521 of the second actuator 52. The second actuator 52 is attached to the inner surface of the lens barrel 10. When the second actuator 52 is driven, the mirror-supporting member 53 rotates around the second axis X2, and the mirror 231 simultaneously rotates around the second axis X2. Note that, the second axis X2 passes through the center of the mirror 231 and crosses the first axis X1. The second axis X2 does not shift with respect to the inner surface of the lens barrel 10. Namely, the direction of the second axis X2 is unchanging with respect to the inner surface. Similarly, the first axis X1 is unchanging with respect to the mirror-supporting member 53.

The first reflecting mirror 23 rotates around the first and second axis X1 and X2, so that the optical axis L of the light-transmitting optical system changes. The rotating-amounts around the first and second axis X1 and X2 are defined respectively in accordance with the deviation represented by the two-dimension coordinates.

In this way, the specific-area reflecting mirror 12 and the erecting optical system 14 (prism) having the selective reflecting surface 141 are provided in the sighting optical system. When the deviation between the optical axis E and the optical axis L is detected on the basis of the difference between the incidence position and the base-position corresponding to the optical axis E, the position of the first reflecting mirror 23 is changed to correct the deviation such that the optical axis L coincides with the optical axis E of the sighting optical system.

The positioning detector may be constructed of other sensor, which is able to detect the light-receiving position. For example, a PSD (Position sensor diode) may be applied in place of the CCD.

Note that, a prism having a reflecting surface may be applied in place of the first reflecting mirror 23 or the second reflecting mirror 24.

In this embodiment, the reflecting area 12X and the penetrating area 12Y are formed in a body. However, the reflecting area 12X and penetrating area 12Y may be formed separately. For example, the penetrating area 12Y is rigidly attached to the inner surface of the lens barrel 10, and the reflecting area 12X is provided such that the reflecting area 12X is movable along the optical axis E.

Note that, a position of an a focal lens 22, which is a refracting lens, may be changed such that the optical axis L of the light-transmitting optical system coincides with the optical axis E of the sighting optical system in place of the first reflecting mirror 23.

An electronic distance-meter for measuring only a distance may be applied as the surveying machine.

Figure 5:
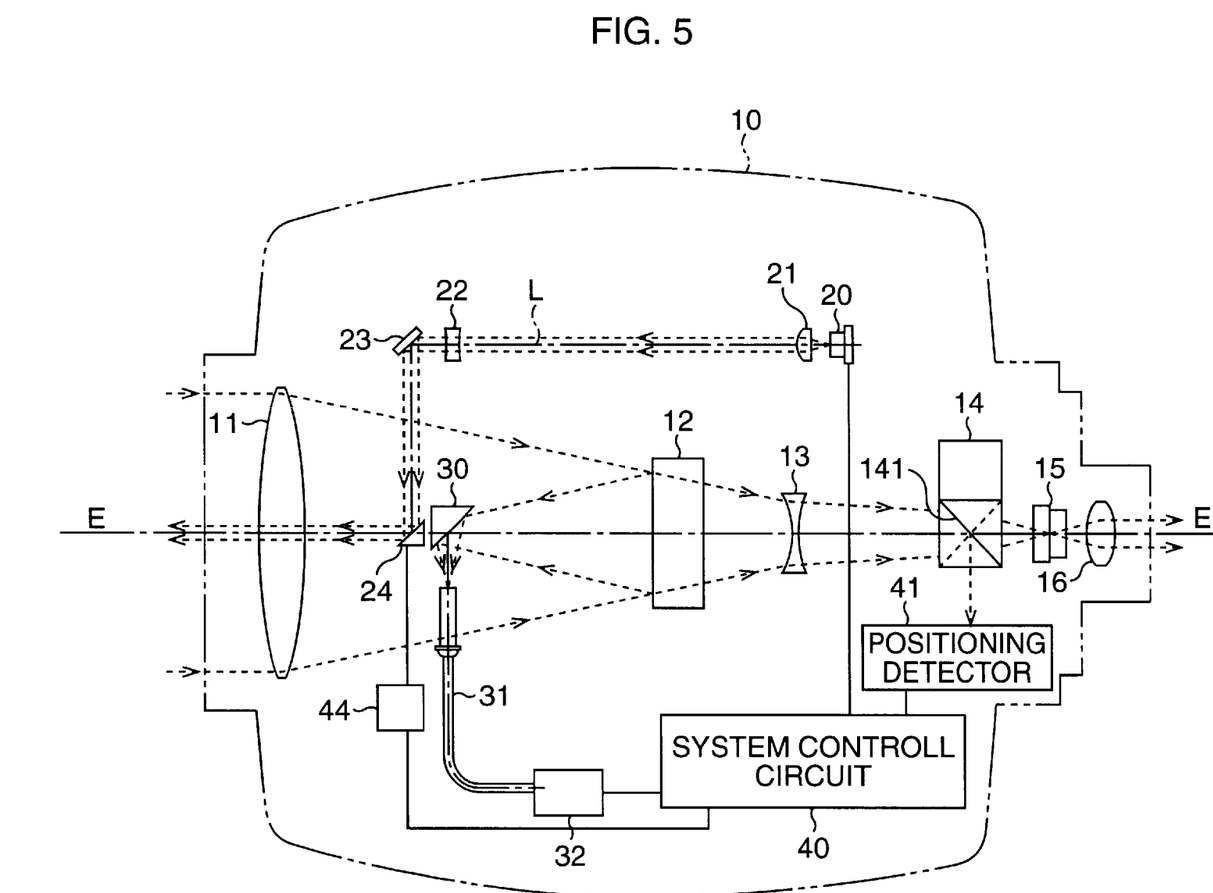
FIG. 5 is a block diagram of a lens barrel provided in a total-station according to a second embodiment.
Figure 6:
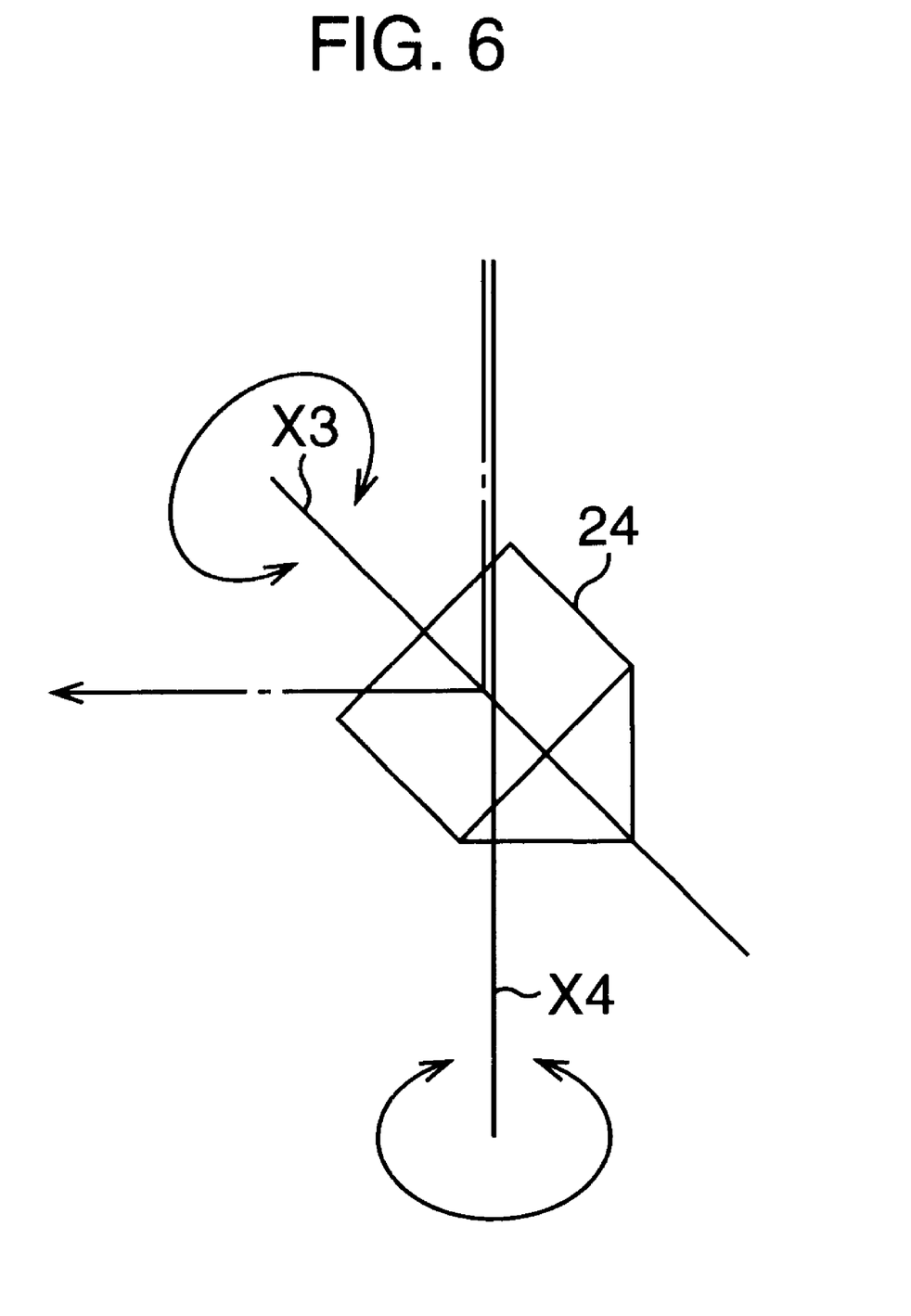
FIG. 6 is a perspective view showing a second reflecting mirror.

With reference to FIGS. 5 and 6, a total-station of a second embodiment is explained. The second embodiment is different from the first embodiment in that the other optical member in the light-transmitting optical system rotates to adjust the optical axis of the light-transmitting optical system. Since the remainder of the second embodiment is similar to the first embodiment, the designation remains the same.

FIG. 5 is a block diagram of a lens barrel in the total-station according to the second embodiment. FIG. 6 is a perspective view showing a second reflecting mirror.

A mirror-rotating mechanism 44 is provided in the lens barrel 10 and is connected to the second reflecting mirror 24 and the system control circuit 40. In the system control circuit 40, based on the difference between the light-receiving position and the base-position, a control signal for adjusting the position, or posture of the second reflecting mirror 24 is fed to the mirror-rotating mechanism 44. The mirror-rotating mechanism 44 adjusts the position of the second reflecting mirror 24 in accordance with the control signal.

As shown in FIG. 6, the second reflecting mirror 24 is rotatable around a third axis X3 and a fourth axis X4, which are perpendicular to each other. Based on the control signal, the mirror mechanism 44 changes the optical axis L of the light-transmitting optical system by rotating the reflecting mirror 24. Note that, the construction of the mirror mechanism 44 is substantially the same as that of the mirror mechanism 43 in the first embodiment.

In this way, in the second embodiment, the deviation is detected and the optical axis L is adjusted such that the optical axis L coincides with the optical axis E of the sighting optical system, similar to the first embodiment.

Figure 7:
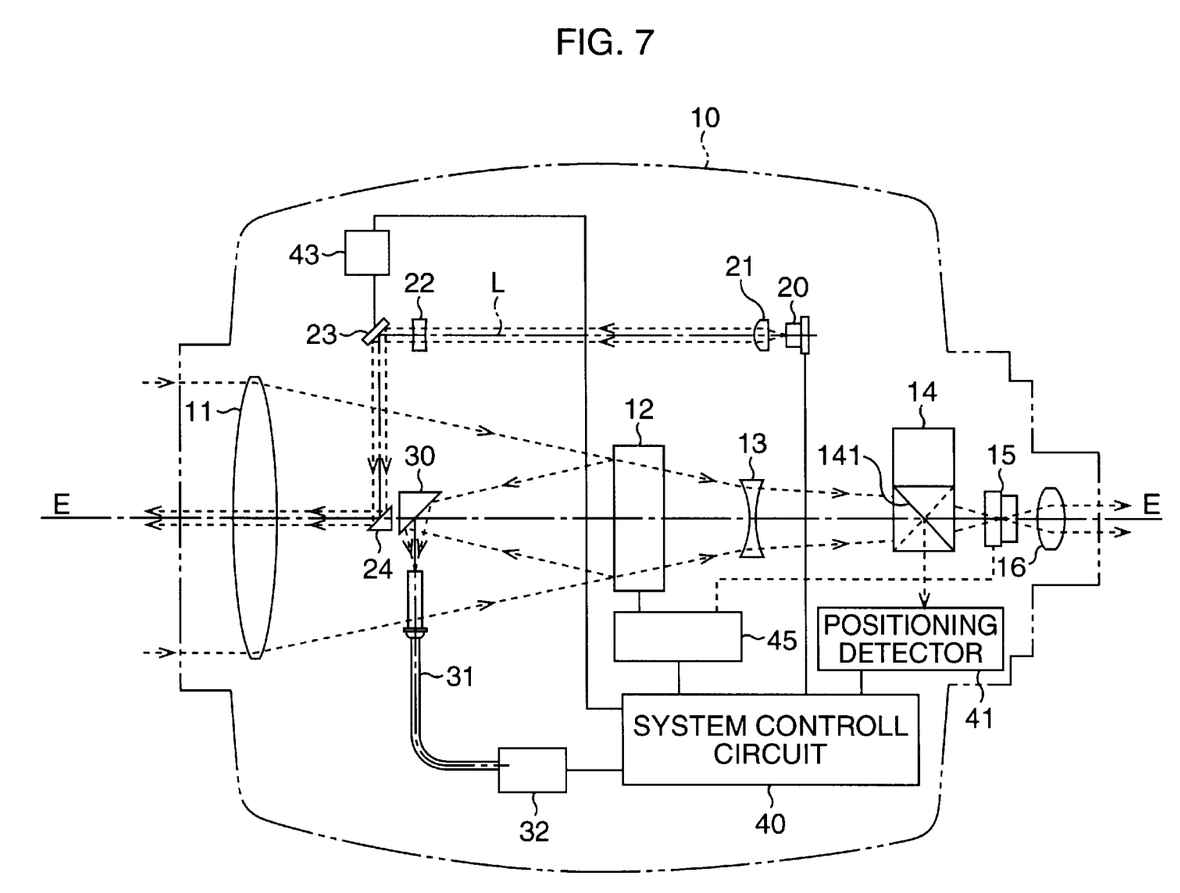
FIG. 7 is a block diagram of a lens barrel provided in a total-station according to a third embodiment.

With reference to FIG. 7, a total-station of a third embodiment is explained. The third embodiment is different from the first and second embodiments in that the optical axis of the sighting optical system is adjusted in place of the optical axis of the light-transmitting optical system. Since the remainder of the second embodiment is similar to the first and second embodiments, the designation remains the same.

FIG. 7 is a block diagram of a lens barrel in the total-station according to the third embodiment.

An optical member rotating mechanism 45 is provided in the lens barrel 10 and is connected to the specific-area reflecting mirror 12 and the system control circuit 40. The optical member rotating mechanism 45 inclines the specific-area reflecting mirror 12 with respect to the optical axis E such that the sighted point SP, corresponding to the center of the cross-shaped line, coincides with a point on the signal target ST, to which the measurement-beam radiated from the total-station reaches. Note that, the optical member rotating mechanism 45 may shift the focusing lens 15 along a plane perpendicular to the optical axis E.

Figure 8:
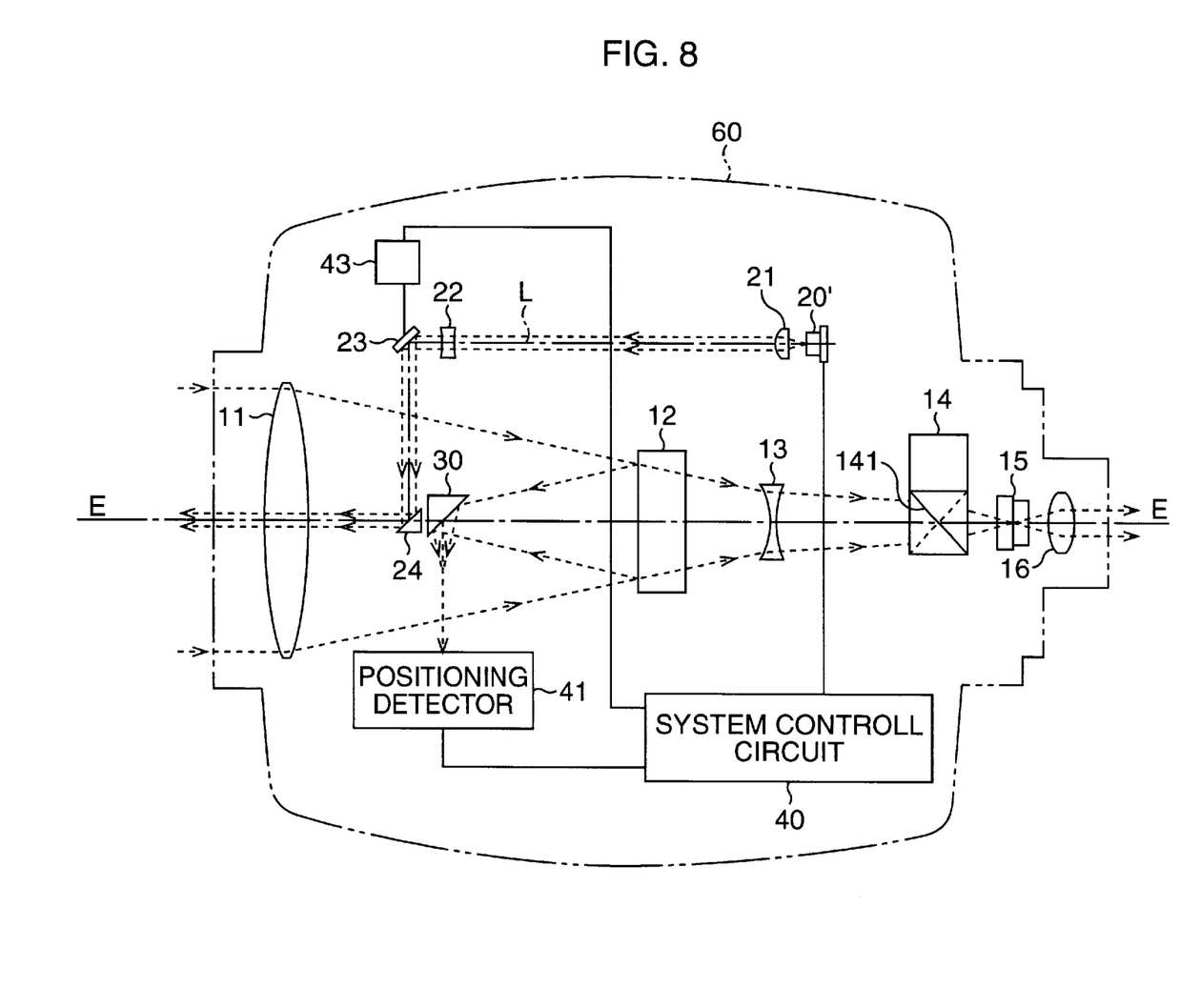
FIG. 8 is a block diagram of a lens barrel provided in a leveling machine according to a fourth embodiment.

With reference to FIG. 8, a total-station of a fourth embodiment is explained. The fourth embodiment is different from the first, second and third embodiments in that a leveling machine is applied as the survey machine. Since the reminder of the second embodiment is similar to the first and second embodiments, the designation remains the same.

FIG. 8 is a block diagram of a lens barrel in the leveling machine according to the fourth embodiment.

In a lens barrel 60 of the leveling machine, a light source 20' for emitting a beam for sighting, is provided. Herein, the beam is Laser. The positioning sensor 41 is provided under the light-receiving mirror 30. The specific-area reflecting mirror 12 reflects light having a specific wavelength area, corresponding to the beam for sighting. The light-receiving mirror 30 receives the light for sighting, and directs the beam to the positioning detector 41.

The position of the first reflecting mirror 23 is adjusted by the system control circuit 40, in accordance with a detecting signal output from the positioning detector 41. The first reflecting mirror 23 is rotated such that the optical axis L of the light-transmitting optical system coincides with the optical axis E of the sighting optical system.

Note that, an electronic/optical theodolite for measuring a horizontal angle and an altitude may be applied as a surveying machine in place of the leveling machine.

The erecting prism 14 having the selective reflecting surface 141, shown in the first embodiment, may be provided in the sighting optical system. In this case, the positioning detector may be provided under the erecting prism 14 and the specific-area reflecting mirror 12 and the light-receiving mirror 30 can be removed.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Applications No. 2001-172161 and No. 2002-036300 (filed on Jun. 7, 2001 and Feb. 14, 2002), which are expressly incorporated herein, by reference, in their entireties.

What is claimed is:

1. A surveying machine automatically adjusting an optical axis comprising:
   a sighting optical system for sighting an object;
   a light-transmitting optical system that transmits a beam for surveying, radiated from a light source, to said object;
   a deviation detector that detects a deviation between a first optical axis corresponding to said sighting optical system and a second optical axis corresponding to said light-transmitting optical system; and
   an optical axis adjuster that automatically adjusts at least one of said first optical axis and said second optical axis so as to correct said deviation.

2. The surveying machine of claim 1, wherein said light-transmitting optical system includes at least one of a reflecting optical member and a refracting optical member, and said optical axis adjuster includes a positioning changer that changes a position of at least one of said reflecting optical member and said refracting optical member, said optical axis adjuster adjusting said second optical axis by changing the position in accordance with said deviation.

3. The surveying machine of claim 1, further comprising:
   a distance detector that measures a distance between said surveying machine and said object by receiving said beam included in reflected light from said object; and
   a specific area reflecting optical member that is arranged in said sighting optical system and has a reflecting area and a penetrating area, said reflecting area selectively reflecting said beam among said reflected light to direct said beam to said distance detector, said penetrating area enabling all of said reflected light to penetrate.

4. The surveying machine of claim 3, wherein said specific area reflecting optical member is constructed of a single member, in which said reflecting area and said penetrating area are formed in a body.

5. The surveying machine of claim 3, wherein said specific area reflecting optical member is constructed of a plurality of members, in which said reflecting area and penetrating area are formed separately.

6. The surveying machine of claim 1, wherein said beam is one of a sighting-beam corresponding to light for sighting and a measurement-beam corresponding to light for measuring, a distance between said surveying machine and said object.

7. The surveying machine of claim 1, wherein said deviation detector includes a selective reflecting optical member that is arranged in said sighting optical system, and divides said beam from reflected light from said object by reflecting said beam.

8. The surveying machine of claim 1, wherein said deviation detector includes a selective penetrating optical member that is arranged in said sighting optical system, and divides said beam from reflected light from said object by enabling said beam to penetrate.

9. The surveying machine of claim 7, wherein said selective reflecting optical member has a first dichroic surface that reflects only light having a wavelength corresponding to said beam.

10. The surveying machine of claim 8, wherein said selective penetrating optical member has a second dichroic surface that enables only light having a wavelength area corresponding to said beam to penetrate.

11. The surveying machine of claim 8, wherein said selective penetrating optical member is an erecting prism having a second dichroic surface that enables only light having a wavelength corresponding to said beam to penetrate, said erecting prism being provided as one of said sighting optical system to erect an object image.

12. The surveying machine of claim 1, wherein said deviation detector detects said deviation from a difference between said first optical axis and a progressing-direction of said beam included in reflected light from said object, which passes through said sighting optical system.

13. The surveying machine of claim 1, wherein said deviation detector includes a two-dimension deviation detector that receives said beam and detects said deviation represented by two-dimensional coordinates defined on a focal plane, said tow-dimension deviation detector detecting said deviation on the basis of on an incidence position of said beam and a preset base-position corresponding to said first optical axis.

14. An automatic optical axis adjusting apparatus of a surveying machine, said surveying machine having a sighting optical system for sighting an object, and a light-transmitting optical system for transmitting a beam for surveying, radiated from a light source, to said object, said automatic optical axis adjusting apparatus comprising:
   a deviation detector that detects a deviation between a first optical axis corresponding to said sighting optical system and a second optical axis corresponding to said light-transmitting optical system; and
   an optical axis adjuster that automatically adjusts at least one of said first optical axis and said second optical axis so as to correct said deviation.

* * * * *